H. CRAMER.
SAUSAGE LINKING MACHINE.
APPLICATION FILED MAR. 12, 1921.
1,384,050.
Patented July 12, 1921.
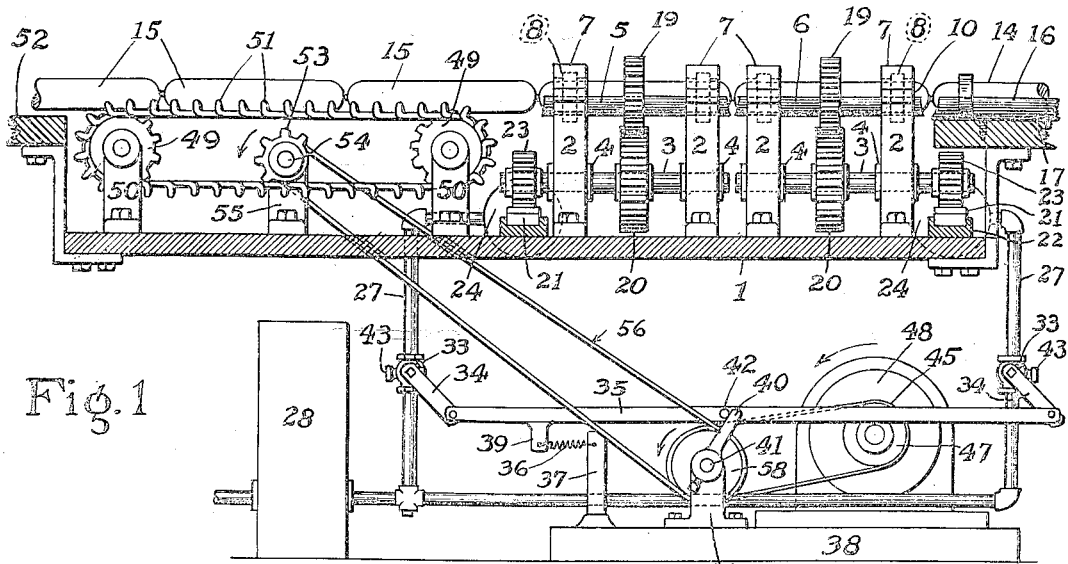
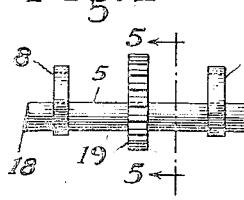
INVENTOR:
Herman Cramer
By John C. Higdon
ATTORNEY

UNITED STATES PATENT OFFICE.

HERMAN CRAMER, OF PINE LAWN, MISSOURI.

SAUSAGE-LINKING MACHINE.

1,384,050. Specification of Letters Patent. Patented July 12, 1921.

Application filed March 12, 1921. Serial No. 451,764.

*To all whom it may concern:*

Be it known that I, HERMAN CRAMER, a citizen of the United States, residing at Pine Lawn, in the county of St. Louis and State of Missouri, have invented certain new and useful Improvements in Sausage-Linking Machines, of which the following is a specification containing a full, clear, and exact description, reference being had to the accompanying drawings, forming a part hereof.

My invention consists in the novel construction and combination of parts hereinafter particularly described and distinctly claimed.

The object of my invention is to provide an improved sausage-linking machine, which shall be automatic in action, simple and reliable in construction and operation, of low cost, and which shall simultaneously make two links of sausage at a time, by twisting or twirling the filled sausage casings in one direction to make one link, and in an opposite direction to make the other link of each pair of links, as the said casings are automatically drawn through the twirling-spoons of the machine, step-by-step, or intermittently, and held in said spoons while the twirling operation is taking place, and thence discharged in the form of finished links, upon an endless feed-chain and carrier.

In the drawings,

Figure 1 is a side-elevation, partly in section of a machine embodying my invention.

Fig. 2 is a detail side-elevation of one of the twirling spoons, detached.

Fig. 3 is an end elevation of the spoon shown in Fig. 2.

Fig. 4 is a top plan-view of the machine shown in Fig. 1, parts being shown in section, and other parts being omitted, for the sake of clearness, and Fig. 5 is a detail cross-section of the twirling-spoon shown in Figs. 2 and 3, the section being taken on the line 5—5 of Fig. 2.

The numeral 1 designates a suitable table or stand, on which is mounted at the right-hand portion thereof, a series of bearing-stands or brackets 2, and two axially-alined spoon driving shafts 3 are mounted in the lower bearings 4 of the said bearing-stands. Immediately above, and parallel with the said spoon-driving shafts 3, are two axially-alined twirling-spoons 5 and 6, which are mounted to rock and revolve in a series of alined upper bearings 7 of the said bearing-stands 2; but endwise movement of said spoons and their driving-shafts is prevented by well-known collars or shoulders on said shafts, and by collars 8 on said spoons.

Said spoon bearings have internal annular recesses 9 in which said collars 8 of said spoons rotate, thereby preventing axial movement of the latter.

The caps of said upper bearings are hinged at 10 to the upper ends of said bearing-stands 2, and are held in a closed position by common thumb-screws 11; whereby the spoons 5 and 6 may be quickly placed in and removed from their bearings, in changing spoons, as well as in cleaning the same.

Said twirling-spoons 5 and 6 are semi-circular in cross-section, and have diametrically-opposite marginal edges 12, which are adapted to engage the filled sausage casing 14 on diametrically opposite sides, and indent the same thereat, and thereby take hold of said casing with a sufficient gripping action to permit said spoons to twirl said casing, in linking the latter by the rotation of said spoons, and yet offer very little resistance to the longitudinal movement of the casing in entering the feed-ends of said spoons, or in passing through the latter, either before the links 15 are formed, or after the latter have been made.

A stationary spoon 16, that is semicircular in cross-section, is fixed on the feed-table 17, and acts in a manner similar to that of the said revoluble spoons, in gripping the casing 14 upon opposite sides; but the function of said fixed spoon is, of course, to prevent rotation of said sausage casing while the latter rests in said fixed spoon or casing-holder, and during the rotation of said parts of said casing that are located in said revoluble spoons, in linking the sausage.

The ends of the revoluble spoons 5 and 6 are flared outwardly at 18, or are rounded outwardly, to prevent cutting of the sausage casing. (Fig. 2.)

The said spoons 5 and 6 are driven by a ring-shaped pinion 19, which encircles them at a point about midway of their length;

said pinion being secured to the outer surface of said spoons by solder, rivets, or any other common fastening means; or said pinion may be formed integral with the spoon which carries it, if so desired.

Said pinions 19 mesh with gear-wheels 20 that are fixed on the said spoon-driving shafts 3, and the latter are driven intermittently and alternately in opposite directions by rack-bars 21 that are mounted to slide in horizontal guides 22 fixed on said table or stand 1 beneath the projecting ends of said shafts.

Pinions 23 are fixed on the projecting ends of the said spoon-driving shafts 3, with the teeth of said pinions in mesh with the teeth of said rack-bars, so that when the latter are reciprocated the said shafts will be rocked and rotated accordingly.

Each of said rack-bars is connected to a piston and cylinder, in the manner now to be described.

Air-cylinders 24 are fitted with pistons 25 and piston-rods 26, and are suitably mounted adjacent the said table 1, and compressed air (or some other fluid) is forced into said cylinders through pipes 27 connecting the cylinders to a suitable source of supply, such as an air-compressor, or a supply-tank or reservoir 28, to move said pistons and piston-rods.

Said piston-rods 26 are connected at 29 to said rack-bars 21, so that when said pistons are reciprocated in their cylinders said rack-bars will also be reciprocated.

The relative positions of said pistons is that shown, in which one of the pistons is near the inner end of its cylinder and the piston of the other cylinder is located near the outer end thereof. Likewise, the inlet-port of the last mentioned cylinder is near the outer end thereof, and the port of the other cylinder is near the inner end thereof, so that the actuating compressed-air or other fluid will be made to enter and be exhausted from the outer end of one cylinder and from the inner end of the other cylinder, and the pistons will be alternately moved, as the valves which control them are actuated.

In the present construction of my invention, the pistons 25 are moved only in one direction by the actuating fluid, and a suitable spring 30 is located in each cylinder, to move the pistons in a reverse direction, after the actuating fluid is shut off and exhausted from said cylinders.

In the present case, the said springs 30 are coiled springs, and in one cylinder the spring is located between the outer cylinder-head 31 and the piston 25 of that cylinder, while in the other cylinder the spring is arranged between the inner head 32 of the last-mentioned cylinder and the piston thereof.

Common three-way valves or cocks 33 are arranged to control the entrance and exhaust of compressed-air or other fluid automatically, the said valves having the usual actuating-handle or lever 34.

There is a valve 33 for each cylinder, and the actuating levers of both valves are pivotally connected by means of a horizontal connecting-rod or bar 35, which is moved in one direction (to open one valve and close the other) by a spring 36 attached at one end to a fixed support 37 rising from the base-plate 38 of the machine, and secured to said connecting-rod 35 at its other end by means of a perforated lug 39 on said connecting-rod.

The said valve-actuating connecting-rod 35 is moved in opposition to the said spring 36 by a rotative tappet-arm 40 carried by a counter-shaft 41 coming in contact with a lug or tappet 42 which projects from said rod 35 in the path of said arm, which strikes said lug and runs off of same as the movement of said arm continues, and immediately the said lug is released the said spring 36 moves said valve-rod in a reverse direction; thus alternately opening and closing the said valves 33.

The fluid is exhausted through common exhaust-ports 43 of the said valves 33, as the latter are alternately opened and closed.

The said counter-shaft 41 is mounted in suitable bearings 44 secured to said base-plate 38, and motion is communicated to said shaft by means of a belt 45 running on a pulley 46 fixed on the shaft and running on another pulley 47 carried by the shaft of a suitable motor 48.

An endless feed-chain and link-carrier is mounted upon sprocket-wheels 49 mounted in brackets or standards 50, at the left-hand (or delivery) end of the machine, the links of said chain having V-shaped fingers 51 which engage the links and pull them through said twirling-spoons 5 and 6, as fast as said links are produced, and the latter are delivered upon a fixed delivery-table 52 which is located at the delivery end of the machine, in about the same horizontal plane as that in which the said feed-chain is located.

Said endless-feed chain is moved intermittently by a mutilated sprocket-pinion 53, the teeth of which engage the said links of said chain as the pinion is rotated.

Said mutilated pinion 53 is fixed on a short shaft 54 that is mounted in bearings 55 and driven by a belt 56 running on a pulley 57 carried by said shaft and communicating motion from said counter-shaft 41 through another pulley 58 fixed on the said counter-shaft.

The form of the motor 48 may be varied, as (for instance) an internal-combustion engine instead of an electric motor may be used. Similarly, other details of the invention may be changed, as desired, without departing from my invention.

*The operation.*

The motor 48 should be of the form known as "low speed," in order that the parts be not too rapidly moved, with the construction shown.

The speed of the machine, in its present form, should be such that two links of sausage 15 be made each minute; but greater speed and capacity can readily be attained by lightening and simplifying the parts of the machine.

Before starting the machine, the filled sausage casing 14 should be drawn into the two twirling-spoons 5 and 6, by means of a cord or string (not shown) tied to the entering end of said casing; then the machine should be started, and the first pair of links 15 that are made should be immediately drawn out of said spoons and onto the said endless feed-chain, when the said V-shaped fingers 51 of said chain will at once grasp the said links and continue the movement of the made links and the casing through the machine, automatically.

The said twirling-spoon 5 will be rotated in one direction, while the other spoon 6 will be simultaneously rotated in an opposite direction, through several revolutions, which movements will indent and twist the said filled casing 14 in three places, to-wit: at the delivery end of said spoon 5, at the space between the adjacent inner ends of said spoons, and at the feed-end of said spoon 6, as shown in Fig. 1, and two links will be formed at each stroke of the said pistons 25, whether said stroke be accomplished by the pressure of the fluid behind said pistons, or by the action of the cylinder springs 30.

The further operation of my invention will be readily apparent from the previous description.

I claim:—

1. A sausage-linking machine having an organized means for simultaneously twirling in opposite directions parts of a filled sausage casing, to form simultaneously from said oppositely-twirled casing two separate connected links, of sausage; in combination with means for drawing the finished connected links as well as the casing from which they are made, through the machine and delivering said links to a delivery-table or platform.

2. A sausage-linking machine constructed with an organized operative means for gripping and simultaneously twirling a filled sausage casing at two separate points in its length, and forming therein two separate sausage-links simultaneously; in combination with means for drawing the said casing step-by-step through the link-forming twirling-means and delivering the formed links to a suitable receptacle.

3. A sausage-linking machine having two axially-alined twirling-spoons that are substantially U-shaped in cross-section; means for rotating said spoons in opposite directions; and an endless-chain having V-shaped fingers which grip the formed links and draw the connected links and the filled sausage casing through the machine.

4. A sausage-linking machine having a pair of axially-alined twirling-spoons that are adapted to grasp and twirl a filled sausage casing simultaneously at two separate points in the length of said casing and form the latter into connected links; toothed means for rotating said spoons; rack-bars connected to said toothed means; a pair of cylinders having pistons and piston-rods, for actuating said rack-bars; valves controlling the admission and exhaust of actuating-fluid for said cylinders; and means for actuating said valves, to cause said pistons to move alternately and simultaneously in opposite directions.

In testimony whereof, I have signed my name to this specification in presence of two subscribing witnesses.

HERMAN CRAMER.

Witnesses:
JOHN C. HIGDON,
HENRY L. HIGDON.